(12) United States Patent
Agiv et al.

(10) Patent No.: US 12,483,533 B2
(45) Date of Patent: Nov. 25, 2025

(54) AUTOMATIC VALIDATIONS AND PRIORITIZATIONS OF INDICATORS OF COMPROMISE

(71) Applicant: The Toronto-Dominion Bank, Toronto (CA)

(72) Inventors: Nir Agiv, Ramat Gan (IL); Moshe Karl, Petah Tikva (IL); Allie David Shay, Sautee Nacoochee, GA (US)

(73) Assignee: The Toronto-Dominion Bank, Toronto (CA)

( * ) Notice: Subject to any disclaimer, the term of this patent is extended or adjusted under 35 U.S.C. 154(b) by 230 days.

(21) Appl. No.: 17/988,528

(22) Filed: Nov. 16, 2022

(65) Prior Publication Data
US 2024/0163254 A1   May 16, 2024

(51) Int. Cl.
| | | |
|---|---|---|
| H04L 9/40 | (2022.01) | |
| G06F 15/16 | (2006.01) | |
| G06F 16/2455 | (2019.01) | |
| G06F 21/55 | (2013.01) | |
| H04L 12/24 | (2006.01) | |
| H04L 12/26 | (2006.01) | |
| H04L 15/16 | (2006.01) | |
| H04L 29/06 | (2006.01) | |
| H04L 41/0893 | (2022.01) | |
| H04L 41/14 | (2022.01) | |

(52) U.S. Cl.
CPC ...... *H04L 63/0263* (2013.01); *H04L 63/1433* (2013.01)

(58) Field of Classification Search
CPC .................. H04L 63/0263; H04L 63/1433

USPC .......................................................... 726/11
See application file for complete search history.

(56) References Cited

U.S. PATENT DOCUMENTS

| | | | |
|---|---|---|---|
| 8,112,365 | B2 | 2/2012 | Foster |
| 8,818,910 | B1 | 8/2014 | Liu et al. |
| 9,037,590 | B2 | 5/2015 | Kumar et al. |
| 9,990,357 | B2 | 6/2018 | Myslinski |
| 10,657,498 | B2 | 5/2020 | Dey et al. |
| 10,769,431 | B2 | 9/2020 | King et al. |

(Continued)

FOREIGN PATENT DOCUMENTS

| | | | | |
|---|---|---|---|---|
| CN | 113449095 | | 9/2021 | |
| WO | WO-2021059015 | A2 * | 4/2021 | ............ A01G 31/06 |
| WO | WO 2022169931 | | 8/2022 | |

OTHER PUBLICATIONS

Ibm.com [online], "IBM Surveillance Insight for Financial Services 2.0.1" Oct. 2022, retrieved on Feb. 17, 2023, retrieved from URL <https://www.ibm.com/docs/en/siffs/2.0.1?topic=libraries-emotion-detection-library>, 3 pages.

(Continued)

*Primary Examiner* — David R Lazaro
*Assistant Examiner* — Berhanu Shitayewoldetadik
(74) *Attorney, Agent, or Firm* — Rowand LLP (57) ABSTRACT

One example method includes receiving indicator of compromise (IOC) intelligence including an IOC. The IOC can then be validated. One or more security systems to add the IOC can then be determined based on one or more risk indicators of the IOC. The IOC can then be added to the one or more security systems. The validation of the IOC may include using machine learning to determine a likelihood of a threat.

20 Claims, 3 Drawing Sheets

(56) References Cited

U.S. PATENT DOCUMENTS

| | | | |
|---|---|---|---|
| 10,896,295 B1 | 1/2021 | Shenoy et al. | |
| 11,182,540 B2 | 11/2021 | Satterfield et al. | |
| 11,386,263 B2 | 7/2022 | Swvigaradoss et al. | |
| 2003/0061346 A1* | 3/2003 | Pekary | H04L 69/40 709/239 |
| 2015/0135317 A1* | 5/2015 | Tock | G06F 21/56 726/23 |
| 2015/0193691 A1* | 7/2015 | Silversides | G01V 5/06 706/11 |
| 2015/0302436 A1 | 10/2015 | Reynolds | |
| 2017/0147984 A1 | 5/2017 | Zoia et al. | |
| 2017/0208084 A1* | 7/2017 | Steelman | H04L 63/0209 |
| 2017/0337596 A1 | 11/2017 | Larkin | |
| 2018/0191747 A1* | 7/2018 | Nachenberg | H04L 63/1416 |
| 2018/0308062 A1 | 10/2018 | Quitmeyer | |
| 2018/0324220 A1* | 11/2018 | Ray | G06F 16/285 |
| 2019/0220824 A1 | 7/2019 | Liu | |
| 2020/0007397 A1* | 1/2020 | Fainberg | H04L 63/20 |
| 2020/0327223 A1* | 10/2020 | Sanchez | G06F 21/554 |
| 2020/0394592 A1 | 12/2020 | Shi et al. | |
| 2021/0006575 A1* | 1/2021 | McLean | H04L 63/1416 |
| 2022/0092716 A1 | 3/2022 | Kuethman | |
| 2022/0131889 A1* | 4/2022 | Scheideler | G06F 21/554 |
| 2022/0188883 A1 | 6/2022 | Rosenberg | |
| 2022/0236843 A1 | 7/2022 | Wilde et al. | |
| 2022/0417255 A1* | 12/2022 | Kwon | H04L 63/145 |

OTHER PUBLICATIONS

Medium.com [online], "From Sentiment Analysis to Emotion Recognition: A NLP story" Jul. 2019, retrieved on Feb. 17, 2023, retrieved from URL <https://medium.com/neuronio/from-sentiment-analysis-to-emotion-recognition-a-nlpstory-bcc9d6ff61ae>, 17 pages.

Shingjergji et al., "Interpretable Explainability in Facial Emotion Recognition and Gamification for Data Collection" 2022 10th International Conference of Affective Computing and Intelligent Interaction, Nov. 2022, 8 pages.

\* cited by examiner

AUTOMATIC VALIDATIONS AND PRIORITIZATIONS OF INDICATORS OF COMPROMISE

TECHNICAL FIELD

The present disclosure relates to computer-implemented methods, software, and systems for automatic indicator of compromise (IOC) validations and prioritizations and threat remediation associated with the IOCs in a networked environment.

BACKGROUND

Modern computer systems and networks have to address and protect themselves from the numerous threats that are designed to infiltrate and/or compromise the security of these systems and networks. Examples of such threats include, among others, viruses, ransomware, and malicious actors attempting to gain unauthorized access to computer systems and networks.

SUMMARY

The present disclosure generally relates to systems, software, and computer-implemented methods for automatic IOC validations and prioritizations and threat remediation associated with the IOCs in a networked environment.

A first example method includes receiving IOC intelligence including an IOC. The IOC can be validated. One or more security systems to add the IOC can be determined based on one or more risk indicators of the IOC. The IOC can be added to the one or more security systems.

Implementations can optionally include one or more of the following features.

In some implementations, validating the IOC includes determining, based on querying security systems, whether the IOC has been added to the security systems. In response to determining that the IOC has not been added to any of the security systems, the IOC can be validated with external sources that include potential IOCs. In response to determining that the IOC matches one or more potential IOCs included in the external sources, it can be determined that the IOC is validated.

In some implementations, determining the one or more security systems to add the IOC includes determining whether the IOC is associated with network security stack or endpoint.

In some implementations, the first example method includes in response to determining that the IOC is associated with network security stack, determining that the IOC is to be added to a firewall, or in response to determining that the IOC is associated with endpoint, determining that the IOC is to be added to at least one of an Endpoint Detection and Response (EDR) system or an Endpoint Protection Platform (EPP).

In some implementations, the first example method includes performing ongoing monitoring of IOCs added to all security systems. A redundancy in adding a redundant IOC to more than one security systems can be identified. The redundant IOC can be removed from at least one of the more than one security systems.

In some implementations, the ongoing monitoring is continuous or periodic.

In some implementations, the one or more security systems include at least one of a firewall, an EDR system, an EPP, or a Splunk platform.

In some implementations, the one or more security systems include a first security system, and where the first example method includes determining, based on the one or more risk indicators of the IOC, a risk score of the IOC. An order of a plurality of IOCs can be determined, based on the risk score of the IOC and at least one risk score of at least one IOC currently added to the first security system, the order of the plurality of IOCs including the IOC and the at least one IOC.

In some implementations, the first example method includes determining that the first security system has satisfied an IOC size limit before adding the IOC. A particular IOC ranked last in the order can be determined based on the order. The particular IOC can be removed from the first security system.

In some implementations, the one or more risk indicators include at least one of potential damage of a potential security threat associated with the IOC, a probability of a potential security threat associated with the IOC, or potential damage of a false positive alert associated with the IOC.

In some implementations, receiving the IOC intelligence includes at least one of receiving IOCs detected by internal teams of an organization, or receiving IOCs from an external source including at least one of an external vendor or an open source organization.

In some implementations, adding the IOC to the one or more security systems includes generating an indication indicating that the IOC should be added to the one or more security systems. The indication can be transmitted to the one or more security systems.

Similar operations and processes associated with each example system may be performed in a different systems comprising at least one processor and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. Additionally, similar operations can be associated with or provided as computer-implemented software embodied on tangible, non-transitory media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

The techniques described herein can be implemented to achieve the following advantages. For example, in some cases, compared to employing manual processes to process IOCs, the solution improves the IOC processing efficiencies by automating the validations and prioritizations of IOCs. Therefore, the new IOCs can be added to security systems quickly and potential cybersecurity attacks associated with these new IOCs can be blocked or mitigated by security systems to reduce the potential damages to the computer systems or networks.

As another example, in some instances, instead of sorting the IOCs by the time they are added to the security systems, the solution prioritizes the IOCs based on a variety of risk indicators representing risk levels of the IOCs, thus further alleviating the security risks compared to the methods that remove the oldest IOCs without considering their risk levels.

DETAILED DESCRIPTION

The present disclosure describes various tools and techniques associated with automatic indicator of compromise (IOC) validations and prioritizations and threat remediation associated with the IOCs in a networked environment.

Modern computer systems and networks have to address and protect themselves from numerous threats. The potential threats to computer systems and networks can be prevented or mitigated by monitoring IOC(s). IOC refers to data indicating that a system may have been infiltrated by a cybersecurity attack. Examples of IOCs include specific identifiers, such as an IP address or domain name, that can be potentially associated with attacker, a hash value of a malicious file that includes malware, unusual outbound network traffic, anomalies in privileged user account activity, geographical irregularities, and others. An IOC can be included in or used by one or more security systems, such as a firewall, an Endpoint Detection and Response (EDR) system, an Endpoint Protection Platform (EPP), or a Splunk platform, among others. The security systems can monitor potential cybersecurity attacks that match or correspond to an identified and registered IOC, and/or subsequently take corrective actions against the cybersecurity attacks. A security system typically has a size limit of the number of IOCs (e.g., maximum 40,000 IOCs) that can be added to the security system.

Conventional methods generally employ manual processes to investigate potential IOCs and determine the security system to add the IOCs. Further, the conventional methods do not prioritize the IOCs. When the size limit of a security system has been met, the conventional methods typically add the newest IOC and remove the oldest IOC without considering their priorities or relative risks.

Accordingly, the conventional methods suffer from multiple deficiencies. As an initial matter, the manual processes are inefficient, and it can sometimes be impossible to investigate the large quantity of potential IOCs or maintain those IOCs in the security systems. As a result, the IOCs are not always added to the security systems in a timely manner. Also, the IOCs in the security systems may not always be up-to-date due to the slow updates of these IOCs. These inefficiencies in the processing of IOCs expose the computer systems or networks to a variety of security threats. Further, the conventional methods sort the IOCs by the time they are added to the security systems, instead of by their risk levels. As a result, a newer IOC can replace an older IOC in a security system, even if the newer IOC is less risky than the older IOC. This also exposes the computer systems or networks to cybersecurity attacks.

In contrast, the techniques described herein enable automatic IOC validations and prioritizations and threat remediation associated with the IOCs in a networked environment. In some implementations, the techniques described herein can include two phases. In the first phase, the techniques can employ an algorithm to automatically validate an IOC based on internal and/or external sources and determine whether the IOC needs to be included in the security system(s). In the second phase, the solution can prioritize the IOC based on one or more risk indicators, determine the security system(s) that the IOC should be added to, and update the corresponding security system(s) to add the IOC. The IOC can then be continuously monitored and corrective action can be taken to address any threat event associated with the IOC. Additional structural and operational details of the techniques are described below.

The techniques described herein can be used in the context of computer and network security and, in particular, automatic validations and prioritizations of IOCs for the security systems in a networked environment (e.g., a financial institution). In some instances, corrective actions can be taken in response to detections of threat events associated with the IOCs. One skilled in the art will appreciate that the above described techniques are not limited to this computer and network security application, but can be applicable in other contexts. For example, in some implementations, the above described techniques can be used to implement Internet moderation and take corrective actions to stop the distributions of, for example, fake news that needs to be controlled or suppressed. In such applications, an assessment engine can collect intelligence including indicators of fake news (e.g., a URL to a website containing the fake news, an IP address of a server that distributes fake news, etc.). Then, the assessment engine can validate the indicators of fake news. When an indicator of fake news is validated, the indicator of fake news can be added to a security system to monitor and/or take corrective actions to stop the fake news from being accessed, published, or viewed on the Internet.

Figure 1:
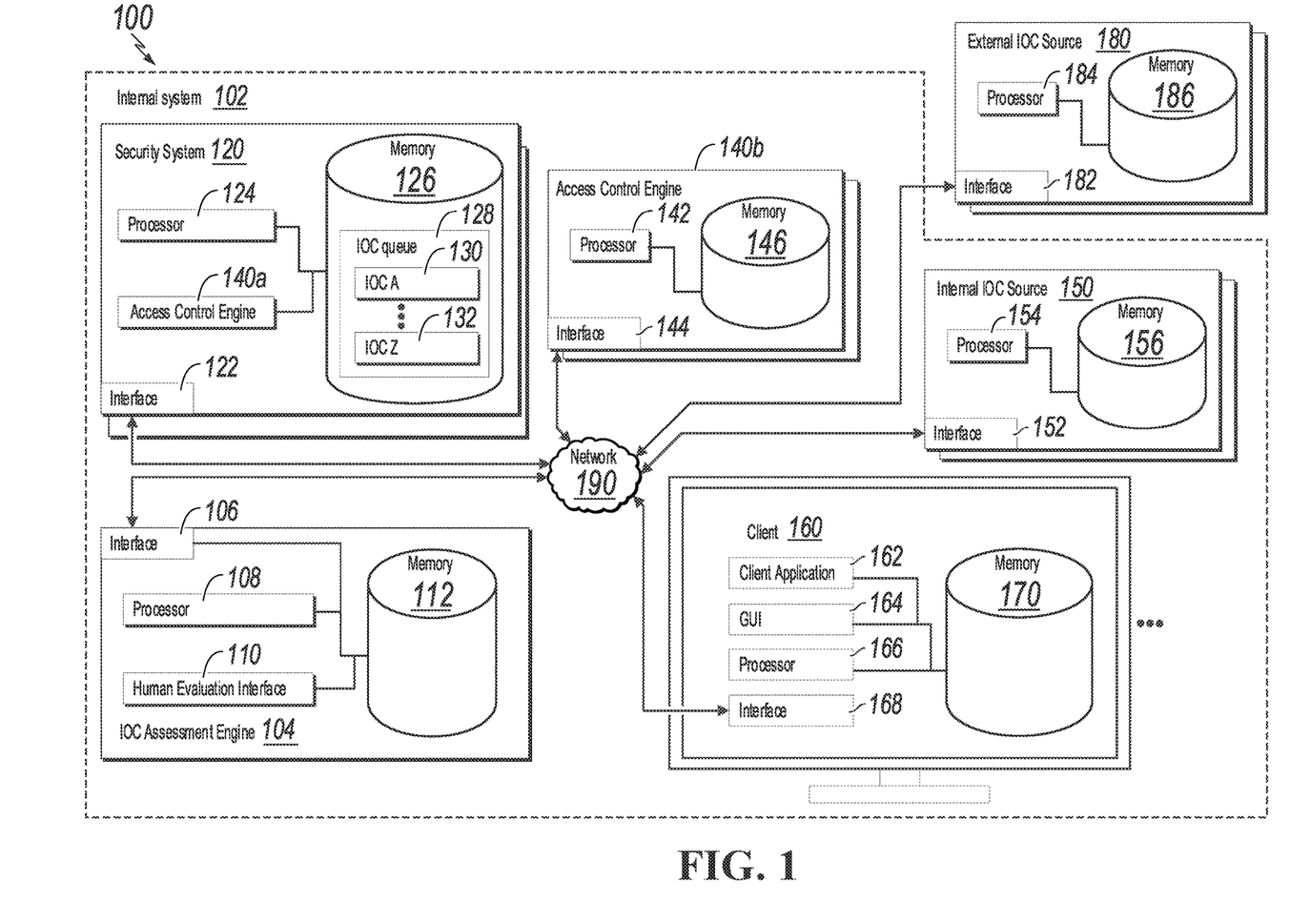
FIG. 1 is a block diagram illustrating an example system for automatic IOC validations and prioritizations and threat remediation associated with the IOCs in a networked environment.

Turning to the illustrated example implementation, FIG. 1 is a block diagram illustrating an example system 100 for automatic IOC validations and prioritizations and threat remediation associated with the IOCs in a networked environment. As further described with reference to FIG. 1, the environment implements various systems that interoperate to collect IOC intelligence, validate potential IOCs, prioritize the IOCs to be added to the security system(s), and subsequently take remediation or security actions in response to detected risks or threats based on the added IOCs (e.g., controlling access of the clients to system resources).

In general, the system 100 allows the illustrated components to share and communicate information across devices and systems (e.g., IOC assessment engine 104, security system 120, access control engine 140b, client 160, internal IOC source 150, and external IOC source 180, among others, via network 190). As described herein, the IOC assessment engine 104, the security system 120, the access control engine 140b, the client 160, the internal IOC source 150, and/or the external IOC source 180 may be cloud-based components or systems (e.g., partially or fully), while in other instances, non-cloud-based systems may be used. In some instances, non-cloud-based systems, such as on-premise systems, client-server applications, and applications running on one or more client devices, as well as combinations thereof, may use or adapt the processes described herein. Although components are shown individually, in some implementations, functionality of two or more components, systems, or servers may be provided by a single component, system, or server.

As used in the present disclosure, the term "computer" is intended to encompass any suitable processing device. For example, the IOC assessment engine 104, the security system 120, the access control engine 140b, the client 160, the internal IOC source 150, and/or the external IOC source 180 may be any computer or processing devices such as, for example, a blade server, general-purpose personal computer (PC), Mac®, workstation, UNIX-based workstation, or any other suitable device. Moreover, although FIG. 1 illustrates a single IOC assessment engine 104, a single security system 120, a single access control engine 140b, a single client 160, a single internal IOC source 150, and/or a single external IOC source 180, any one of the IOC assessment engine 104, the security system 120, the access control engine 140b, the client 160, the internal IOC source 150, and/or the external IOC source 180 can be implemented using a single system or more than those illustrated, as well as computers other than servers, including a server pool. In other words, the present disclosure contemplates computers other than general-purpose computers, as well as computers without conventional operating systems. In some instances, the IOC assessment engine 104, the security system 120, the access control engine 140b, the client 160, the internal IOC source 150, and/or the external IOC source 180 may be a desktop system, a client terminal, or any other suitable device, including a mobile device, such as a smartphone, tablet, smartwatch, or any other mobile computing device. In general, each illustrated component may be adapted to execute any suitable operating system, including Linux, UNIX, Windows, Mac OS®, Java™, Android™ Windows Phone OS, or iOS™, among others. The IOC assessment engine 104, the security system 120, the access control engine 140b, the client 160, the internal IOC source 150, and/or the external IOC source 180 may include one or more IOC-specific applications executing on the IOC assessment engine 104, the security system 120, the access control engine 140b, the client 160, the internal IOC source 150, and/or the external IOC source 180, or the IOC assessment engine 104, the security system 120, the access control engine 140b, the client 160, the internal IOC source 150, and/or the external IOC source 180 may include one or more Web browsers or web applications that can interact with particular applications executing remotely from the IOC assessment engine 104, the security system 120, the access control engine 140b, the client 160, the internal IOC source 150, and/or the external IOC source 180, such as the client application 162, among others.

The internal system 102 can be, for example, the computer systems and networks internal to an organization. The organization can be any one of, for example, companies, corporations, governments, non-governmental organizations, political organizations, international organizations, armed forces, charities, not-for-profit corporations, partnerships, cooperatives, and educational institutions, etc. The internal system 102 can include one or more IOC assessment engines 104, one or more security systems 120, one or more access control engines 140b, one or more clients 160, and/or one or more internal IOC sources 150.

As illustrated, the IOC assessment engine 104 includes or is associated with interface 106, processor(s) 108, human evaluation interface 110, and memory 112. While illustrated as provided by or included in the IOC assessment engine 104, parts of the illustrated components/functionality of the IOC assessment engine 104 may be separate or remote from the IOC assessment engine 104, or the IOC assessment engine 104 may itself be distributed across the network 190.

The interface 106 of the IOC assessment engine 104 is used by the IOC assessment engine 104 for communicating with other systems in a distributed environment—including within the environment 100—connected to the network 190, such as the security system 120, the access control engine 140b, the client 160, the internal IOC source 150, the external IOC source 180, and other systems communicably coupled to the illustrated IOC assessment engine 104 and/or network 190. Generally, the interface 106 includes logic encoded in software and/or hardware in a suitable combination and operable to communicate with the network 190 and other components. More specifically, the interface 106 can include software supporting one or more communication protocols associated with communications such that the network 190 and/or interface's hardware is operable to communicate physical signals within and outside of the illustrated system 100. Still further, the interface 106 can allow the IOC assessment engine 104 to communicate with the security system 120, the access control engine 140b, the client 160, the internal IOC source 150, the external IOC source 180, and/or other portions illustrated within the IOC assessment engine 104 to perform the operations described herein.

The IOC assessment engine 104, as illustrated, includes one or more processors 108. Although illustrated as a single processor 108 in FIG. 1, multiple processors may be used according to particular needs, desires, or particular implementations of the system 100. Each processor 108 may be a central processing unit (CPU), an application specific integrated circuit (ASIC), a field-programmable gate array (FPGA), or another suitable component. Generally, the processor 108 executes instructions and manipulates data to perform the operations of the IOC assessment engine 104. Specifically, the processor 108 executes the algorithms and operations described in the illustrated figures, as well as the various software modules and functionality, including the functionality for sending communications to and receiving transmissions from the security system 120, the access control engine 140b, the client 160, the internal IOC source 150, the external IOC source 180, as well as to other devices and systems. Each processor 108 may have a single or multiple core, with each core available to host and execute an individual processing thread. Further, the number of, types of, and particular processors 108 used to execute the operations described herein may be dynamically determined based on a number of requests, interactions, and operations associated with the IOC assessment engine 104.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including, e.g., C, C++, JavaScript, Java™, Visual Basic, assembler, Perl®, any suitable version of 4GL, as well as others.

As illustrated, the IOC assessment engine 104 can include a human evaluation interface 110. In some implementations, upon determining that a potential IOC is validated (e.g., validating against external sources to determine that the IOC is a genuine threat) and before adding the IOC to security system(s) 120, the IOC assessment may be sent, via the human evaluation interface 110 and over network 190, to a system administrator's system (not shown) where a human verifier can further evaluate whether the IOC is an actual threat or not. In such implementations, the human verifier can communicate, using the administrator's system and to the security system(s) 120, whether an IOC poses an actual threat and then, the security system(s) 120 can add the IOC. In some implementations, the human verification is optional and need not be performed as part of the IOC assessment.

The IOC assessment engine 104 can also include memory 112, which may represent a single memory or multiple memories. The memory 112 may include any memory or database module and may take the form of volatile or non-volatile memory including, without limitation, magnetic media, optical media, random access memory (RAM), read-only memory (ROM), removable media, or any other suitable local or remote memory component. The memory 112 may store various objects or data associated with the IOC assessment engine 104, including any parameters, variables, algorithms, instructions, rules, constraints, or references thereto. While illustrated within the IOC assessment engine 104, memory 112 or any portion thereof, including some or all of the particular illustrated components, may be located remote from the IOC assessment engine 104 in some instances, including as a cloud application or repository, or as a separate cloud application or repository when the IOC assessment engine 104 itself is a cloud-based system.

As noted, each of the one or more security systems 120 can store a list of IOCs and continuously monitor and/or take corrective actions against threat events associated with the IOCs. The security system 120 can be, for example, a firewall, an EDR system, an EPP, a Splunk platform, etc. As illustrated, the security system 120 includes various components, including at least one processor 124 (which can be operationally and/or structurally similar to processor(s) 108, and which can execute the functionality of the security system 120), interface 122 for communication (which can be operationally and/or structurally similar to interface 106), access control engine 140a, and at least one memory 126 (which can be operationally and/or structurally similar to memory 112).

The access control engine 140a can take corrective actions against threat events associated with an IOC in response to detection of a threat event associated with the IOC. While the access control engine 140a is illustrated as in the security system 120, the access control engine 140a can be separated from the security system 120 and executed, for example, elsewhere in the internal system 102, as illustrated by the access control engine 140b. Any suitable solution may be implemented within the scope of the present disclosure.

As illustrated, the at least one memory 126 can include an IOC queue 128 storing a list of IOCs from IOC A 130 to IOC Z 132 that have been added to the security system 120. The security system 120 can continuously monitor threat events associated with the IOCs in the IOC queue 128. In some implementations, there can be a limit on the quantity of IOCs that can be added to the IOC queue 128. When the limit is reached, no additional IOC can be added to the IOC queue 128, unless any existing IOC is first removed from the IOC queue 128.

As noted and similar to the access control engine 140a, the access control engine 140b can take corrective actions against threat events associated with an IOC, when a threat event associated with the IOC is detected. As illustrated, the access control engine 140b includes various components, including at least one processor 142 (which can be operationally and/or structurally similar to processor(s) 108, and which can execute the functionality of the access control engine 140b), interface 144 for communication (which can be operationally and/or structurally similar to interface 106), and at least one memory 146 (which can be operationally and/or structurally similar to memory 112).

As illustrated, one or more clients 160 may be present in the example system 100. Although FIG. 1 illustrates a single client 160, multiple clients may be deployed and in use according to the particular needs, desires, or particular implementations of the system 100. Each client 160 can be associated with a particular user (e.g., an employee or a customer of an organization), or may be accessed by multiple users, where a particular user is associated with a current session or interaction at the client 160. Client 160 can be a client device at which the user is linked or associated, or a client device through which the user interacts with the IOC assessment engine 104, the security system 120, the access control engine 140b, etc. As illustrated, the client 160 can include an interface 168 for communication (which can be operationally and/or structurally similar to interface 106), at least one processor 166 (which can be operationally and/or structurally similar to processor 108), a graphical user interface (GUI) 164, a client application 162, and at least one memory 170 (which can be operationally and/or structurally similar to memory 112) storing information associated with the client 160.

The illustrated client 160 is intended to encompass any computing device, such as a desktop computer, laptop/notebook computer, mobile device, smartphone, personal data assistant (PDA), tablet computing device, one or more processors within these devices, or any other suitable processing device. In general, the client 160 and its components may be adapted to execute any operating system. In some instances, the client 160 may be a computer that includes an input device, such as a keypad, touch screen, or other device(s) that can interact with one or more client applications, such as one or more mobile applications, including for example a web browser, a banking application, or other suitable applications, and an output device that conveys information associated with the operation of the applications and their application windows to the user of the client 160. Such information may include digital data, visual information, or a GUI 164, as shown with respect to the client 160. Specifically, the client 160 may be any computing device operable to communicate with the IOC assessment engine 104, the security system 120, the access control engine 140b, the internal IOC source 150, the external IOC source 180, other clients 160, and/or other components via network 190, as well as with the network 190 itself, using a wireline or wireless connection. In general, the client 160 includes an electronic computer device operable to receive, transmit, process, and store any appropriate data associated with the system 100 of FIG. 1.

The client application 162 executing on the client 160 may include any suitable application, program, mobile app, or other component. Client application 162 can interact with the IOC assessment engine 104, the security system 120, the access control engine 140b, the internal IOC source 150, the external IOC source 180, other clients 160, or portions thereof, via network 190. In some instances, the client application 162 can be a web browser, where the functionality of the client application 162 can be realized using a web application or website that the user can access and interact with via the client application 162. In other instances, the client application 162 can be a remote agent, component, or client-side version of the security system 120 and/or the access control engine 140b, or a dedicated application associated with the security system 120 and/or the access control engine 140b. In some instances, the client application 162 can interact directly or indirectly (e.g., via a proxy server or device) with the security system 120 and/or the access control engine 140b, or portions thereof. The client application 162 may be used to view, interact with, or otherwise transact data exchanges with the security system 120 and/or the access control engine 140b, and to allow interactions for IOC monitoring and access control via the security system 120 and/or the access control engine 140b.

GUI 164 of the client 160 interfaces with at least a portion of the system 100 for any suitable purpose, including generating a visual representation of any particular client application 162 and/or the content associated with any components of the IOC assessment engine 104, the security system 120, the access control engine 140b, the internal IOC source 150, the external IOC source 180, and/or other clients 160. For example, the GUI 164 can be used to present screens and information associated with the security system 120 (e.g., one or more interfaces identifying IOC(s) detected on the client 160) and interactions associated therewith, as well as access control-related presentations associated with the access control engine 140b (e.g., one or more interfaces noting whether access to a particular resource has been granted or denied). GUI 164 may also be used to view and interact with various web pages, applications, and web services located local or external to the client 160. Generally, the GUI 164 provides the user with an efficient and user-friendly presentation of data provided by or communicated within the system. The GUI 164 can include a plurality of customizable frames or views having interactive fields, pull-down lists, and buttons operated by the user. In general, the GUI 164 is often configurable, supports a combination of tables and graphs (bar, line, pie, status dials, etc.), and is able to build real-time portals, application windows, and presentations. Therefore, the GUI 164 contemplates any suitable graphical user interface, such as a combination of a generic web browser, a web-enable application, intelligent engine, and command line interface (CLI) that processes information in the platform and efficiently presents the results to the user visually.

The internal IOC source 150 can be, for example, one or more computers deployed in the internal system 102. The one or more computers can be associated with, for example, one or more internal users of the organization (e.g., an employee of the organization). The internal IOC source 150 can continuously monitor activities of various objects (e.g., client 160, security system 120, etc.) in the networked environment (e.g., internal system 102) to detect threat events. When a threat event is detected, the internal IOC source 150 can send an IOC corresponding to the threat event to the IOC assessment engine 104. For example, one or more computers of an information security team of an organization can continuously monitor threat events of the computer systems and networks of the organization. When the one or more computers detect, for example, that one or more client devices have visited a website and are infected with a common malware, the one or more computers can send the uniform resource locator (URL) of the website to the IOC assessment engine 104.

As illustrated, the internal IOC source 150 includes various components, including at least one processor 154 (which can be operationally and/or structurally similar to processor(s) 108, and which can execute the functionality of the internal IOC source 150), interface 152 for communication (which can be operationally and/or structurally similar to interface 106), and at least one memory 156 (which can be operationally and/or structurally similar to memory 112).

The external IOC source 180 can be, for example, one or more computers associated with an external vendor paid to provide IOC intelligence, an open source intelligence (e.g., feeds, websites, etc.), a partner organization such as a governmental entity and/or a business entity (e.g., Federal Bureau of Investigation (FBI), U.S. Securities and Exchange Commission (SEC), etc.). In some cases, the IOC assessment engine 104 can receive IOC intelligence from the external IOC source 180 periodically (e.g., every 30 days, every 7 days, etc.). In some cases, the IOC assessment engine 104 can receive IOC intelligence from the external IOC source 180 when a predetermined event occurs. For example, the IOC assessment engine 104 can receive IOC intelligence from the external IOC source 180 when the external IOC source 180 accumulates a predetermined quantity of IOCs that have not yet been sent to the IOC assessment engine 104.

As illustrated, the external IOC source 180 includes various components, including at least one processor 184 (which can be operationally and/or structurally similar to processor(s) 108, and which can execute the functionality of the external IOC source 180), interface 182 for communication (which can be operationally and/or structurally similar to interface 106), and at least one memory 186 (which can be operationally and/or structurally similar to memory 112).

Network 190 facilitates wireless or wireline communications between the components of the system 100 (e.g., between the IOC assessment engine 104, the security system 120, the access control engine 140b, the client 160, the internal IOC source 150, and/or the external IOC source 180, etc.), as well as with any other local or remote computers, such as additional mobile devices, clients, servers, or other devices communicably coupled to network 190, including those not illustrated in FIG. 1. In the illustrated environment, the network 190 is depicted as a single network, but may be included of more than one network without departing from the scope of this disclosure, so long as at least a portion of the network 190 may facilitate communications between senders and recipients. In some instances, one or more of the illustrated components (e.g., the IOC assessment engine 104, the security system 120, the access control engine 140b, the client 160, the internal IOC source 150, the external IOC source 180, etc.) can be included within or deployed to network 190, or a portion thereof as one or more cloud-based services or operations. The network 190 can be all or a portion of an enterprise or secured network, while in another instance, at least a portion of the network 190 may represent a connection to the Internet. In some instances, a portion of the network 190 may be a virtual private network (VPN). Further, all or a portion of the network 190 can include either a wireline or wireless link. Example wireless links may include 802.11a/b/g/n/ac, 802.20, WiMax, LTE, and/or any other appropriate wireless link. In other words, the network 190 encompasses any internal or external network, networks, sub-network, or combination thereof operable to facilitate communications between various computing components inside and outside the illustrated system 100. The network 190 may communicate, for example, Internet Protocol (IP) packets, Frame Relay frames, Asynchronous Transfer Mode (ATM) cells, voice, video, data, and other suitable information between network addresses. The network 190 may also include one or more local area networks (LANs), radio access networks (RANs), metropolitan area networks (MANs), wide area networks (WANs), all or a portion of the Internet, and/or any other communication system or systems at one or more locations.

While portions of the elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2:
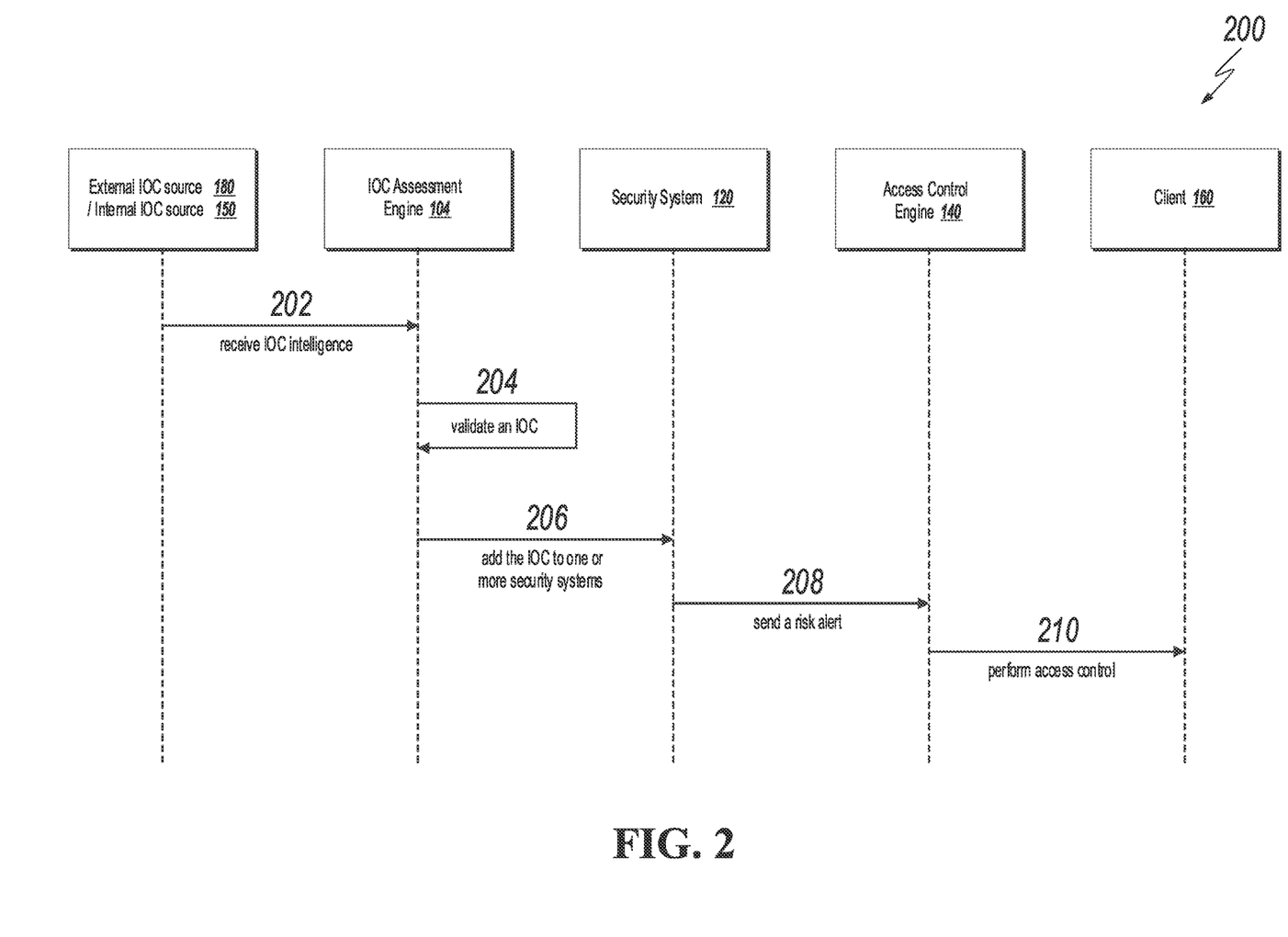
FIG. 2 illustrates a flow diagram of example interactions performed for automatic IOC validations and prioritizations and threat remediation associated with the IOCs in a networked environment.

FIG. 2 illustrates a flow diagram of example interactions 200 performed for automatic IOC validations and prioritizations and threat remediation associated with the IOCs in a networked environment, such as the networked system 100. As explained further below, this flow diagram describes an automatic process of validating potential IOCs and prioritizing the IOCs to be added to the security system(s) and subsequently controlling access of the client to system and network resources based on detecting IOC(s) associated with the client. As illustrated, FIG. 2 is illustrated with interactions between the external IOC source 180, the internal IOC source 150, the IOC assessment engine 104, the security system 120, the access control engine 140 (e.g., the access control engine 140a and/or the access control engine 140b as illustrated in FIG. 1), and the client 160.

In one instance, interactions 200 can be performed at a predetermined interval (e.g., every 7 days, every 24 hours, etc.). In other instances, the interactions 200 can be performed upon the occurrence of a particular event or combination of events (e.g., receiving new IOC intelligence).

At 202, the IOC assessment engine 104 can receive IOC intelligence from at least one of the external IOC source 180 or the internal IOC source 150. The external IOC source 180 can be, for example, one or more computers associated with an external vendor paid to provide IOC intelligence, an open source intelligence (e.g., feeds, web sites, etc.), a partner organization such as a governmental entity and/or a business entity (e.g., Federal Bureau of Investigation (FBI), U.S. Securities and Exchange Commission (SEC), etc.). In some cases, the IOC assessment engine 104 can receive IOC intelligence from the external IOC source 180 periodically (e.g., every 30 days, every 7 days, etc.). In some cases, the IOC assessment engine 104 can receive IOC intelligence from the external IOC source 180 when a predetermined event occurs. For example, the IOC assessment engine 104 can receive IOC intelligence from the external IOC source 180 when the external IOC source 180 accumulates a predetermined quantity of IOCs that have not yet been sent to the IOC assessment engine 104.

The internal IOC source 150 can be, for example, one or more computers deployed in the internal system 102. The one or more computers can be associated with, for example, one or more internal users of the organization (e.g., an employee of the organization). The internal IOC source 150 can continuously monitor activities of various objects (e.g., client 160, security system 120, etc.) in the networked environment (e.g., internal system 102) to detect threat events. When a threat event is detected, the internal IOC source 150 can send an IOC corresponding to the threat event to the IOC assessment engine 104. For example, one or more computers of an information security team of an organization can continuously monitor threat events of the computer systems and networks of the organization. When the one or more computers detect, for example, that one or more client devices have visited a website and are infected with a common malware, the one or more computers can send the uniform resource locator (URL) of the website to the IOC assessment engine 104.

At 204, the IOC assessment engine 104 can validate one or more IOCs included in the received IOC intelligence to determine whether further action(s) need to be taken on the IOC. In some instances, the validation can include querying internal systems and validating against external source(s).

By querying internal systems, the IOC assessment engine 104 can determine whether an IOC in the IOC intelligence has already been blocked or monitored by the security system(s) 120. The security system(s) 120 can include, for example, one or more of a firewall, an EDR system, an EPP, or a Splunk platform. In some cases, if the IOC is actively being blocked or monitored by the security system(s), the rest of the operations on the IOC can be skipped because there is no need to add the IOC to the security system(s) 120 again. On the contrary, if the IOC has not yet been blocked or monitored by the security system(s) 120, the IOC can be validated against external source(s).

By validating against external source(s), the IOC assessment engine 104 can determine whether the IOC is a genuine threat. In some implementations, validating against external source(s) can include, for example, determining a quantity of the external sources that identify the IOC as a threat, or otherwise evaluating the likelihood that the IOC is a threat. This can include automatic analysis of systems, as well as determinations as to whether the IOC is actually an issue and not a false positive.

For example, the IOC assessment engine 104 can automatically collect IOC information (e.g., IOC lists, news about IOCs, articles about IOCs, etc.) from multiple external sources in response to receiving an indication that the IOC has not yet been added to the security system(s) 120, where each piece of IOC information can mention one or more IOCs. The IOC assessment engine 104 can then perform textual analysis on the collected IOC information to determine a quantity of the external sources that mentioned the IOC. If the quantity of the external sources that mentioned the IOC satisfies (e.g., exceeds or meets) a predetermined threshold (e.g., five, ten, etc.), the IOC can be determined to be a genuine threat. For another example, a machine learning model can be trained to determine a likelihood that the IOC is a genuine threat. The machine learning model can be trained using multiple samples, where each sample includes, for example, texts describing or mentioning the IOC and a label indicating whether the IOC is a genuine threat. After the machine learning model is trained, the IOC assessment engine 104 can then input information associated with the IOC into the machine learning model to determine a likelihood that the IOC is a genuine threat. In some cases, if the IOC is determined not to be a genuine threat, the rest of the operations on the IOC can be skipped.

In some examples, if the IOC is determined to be a genuine threat, past data can be checked to determine whether internal computer systems or networks encounter the IOC in the past. If the IOC appeared in the internal computer systems or networks in the past, it can indicate that the internal systems were under attack, but no one was aware of it. If the internal systems encountered the IOC in the past, an internal investigation process can be initiated to prevent further impacts of the attack.

For example, the IOC can be a hash value of a malicious file. The internal computer systems or networks can be checked to see whether the hash value existed in the file history of the internal computer systems or networks. If yes, it can indicate that someone may have opened this file and/or done something with it. Therefore, the internal investigation process can be initiated to mitigate further damages caused by the malicious file.

In some cases, if the IOC appeared in the internal computer systems or networks in the past, message(s) and/or associated alert(s) can be generated automatically and sent to the appropriate security team(s). Using the example above where the IOC is a hash value of a malicious file, message(s) and/or alert(s) associated with the hash value of the malicious file can be generated and sent to, for example, information security team, the team of the employee who opened the malicious file, etc.

At 206, the IOC can be added to one or more security systems 120. In some cases, the one or more security systems to add the IOC can be determined based on one or more risk indicators. The determined one or more security systems can then be updated to add the IOC.

The risk indicator can include, for example, the type of the IOC, and the one or more security systems to add the IOC can be determined based on the type of the IOC. The type of the IOC can indicate the risk associated with the IOC and when the attack will be potentially encountered in the organization in order to defend against it. For example, the IOC associated with network security stack generally should be added to the firewall to block the malicious network traffic before it reaches the organization's internal computer systems and networks. In contrast, the hash value of a file is preferred to be added to an endpoint solution (e.g., EDR or EPP) because files can be sent, for example, from one endpoint to another without passing the firewall.

In some cases, it can be determined that an IOC needs to be added to more than one security systems. For example, for the IOC indicating malicious activities which are prevalent and common, the IOC can be added to both of the firewall and the endpoint solution (e.g., EDR or EPP) to decrease the chance of missing potential attacks associated with the IOC.

In some cases, after validating the IOCs included in the IOC intelligence and before adding the IOCs to the security system(s), the validated IOCs can be sorted based on one or more risk indicators to generate a prioritization list. The prioritization list can determine an order of handling the validated IOCs. In some implementations, each of the security system(s) can have a limited IOC size limit (i.e., a limit on the quantity of IOCs that can be added to the security system) and may not be able to accommodate all IOCs in the prioritization list. Therefore, compared to an IOC having a lower priority, an IOC having a higher priority on the prioritization list has a higher chance of being successfully added to the security system(s).

For example, assume that validated IOCs include IOC A and IOC B, where IOC A has a higher priority than IOC B. Assume further that both of IOC A and IOC B are determined to be added to the firewall. Assume further that the firewall almost reaches its IOC size limit and its capacity only allows to take one more IOC. In this case, the IOC A will be added to the firewall, whereas IOC B will not be added to the firewall due to the firewall reaching its IOC size limit.

In some implementations, sorting the validated IOCs can be based on aggregate risk scores of the validated IOCs, where the aggregate risk score of each IOC indicates a threat level of the IOC and is determined based on one or more risk indicators associated with the IOC. A high aggregate risk score can correspond to a potential large impact caused by an attack associated with the IOC, whereas a low aggregate risk score can correspond to a potential small impact caused by an attack associated with the IOC. The validated IOCs can be sorted, for example, from the highest aggregate risk score to the lowest aggregate risk score. For an IOC, a respective risk score can be determined for each of the one or more risk indicators, where each risk indicator can have a respective weight. The aggregate risk score can be computed by combining risk scores of all risk indicators modulated by their respective weights. For example, the aggregate risk score computation can be represented using the following equation:

$$\text{Aggregate Risk Score} = \sum_i \text{risk score}_i * \text{weight}_i$$

As used in the above equation, risk score$_i$ represents a risk score of $i^{th}$ risk indicator, and weight$_i$ represents a weight of the $i^{th}$ risk indicator. The weight can be a static, but tunable, value, and can be adjusted to any value according to the risk score distributions.

For example, assuming that an IOC is associated with three risk indicators. The three risk indicators have the risk scores of 100, 40, and 40, respectively. The three risk indicators have the predetermined weights of 40, 20, and 60, respectively. The aggregate risk score can be computed as 100*40+40*20+40*60=7200.

In some implementations, the one or more risk indicators include at least one of: potential damage of a potential security threat associated with the IOC, a probability of a potential security threat associated with the IOC, or a potential damage of a false positive alert associated with the IOC.

The potential damage of a potential security threat associated with the IOC can include, but not limited to, the economic loss, the unavailability of the system, the negative impacts on the reputation of an organization, etc., that are caused by the potential security threat. A greater potential damage can correspond to a higher risk score. For example, some ransomware could lead to significant economic loss, impact on the systems' availability, and negative impacts on the reputation of the organization. In contrast, some IOCs associated with small scams or phishing attempts that are not as organized as the ransomware described above have smaller potential loss and negative impacts. Therefore, risk score associated with large ransomware can be higher than risk score associated with small scams or phishing attempts.

The probability of a potential security threat associated with the IOC can be, for example, an occurrence probability of the potential security threat. A greater probability can correspond to a higher risk score. In some cases, even if the IOC is validated, the security threat associated the IOC may have a low chance of occurrence to an organization. For example, some organized hacker attacks are targeted for specific countries or organizations. Such hacker attacks will unlikely occur to an organization that is not the target of the hacker attacks. Therefore, as to the organization, risk score associated with such organized hacker attacks can be low.

The potential damage of a false positive alert associated with the IOC can include, but not limited to, the economic loss, unavailability of the system, negative impacts on the reputation of an organization, etc., that are caused by a false positive alert associated with the IOC. In some cases, even if an IOC has been validated, the IOC can be a false positive alert and not a genuine threat. If the IOC is blocked by the security system(s), it can cause significant damages to the organization. For example, a number of external sources can report that an IOC is a potential security threat, even though it is still under investigation. Given the large quantity of external sources reporting it, the IOC can be determined to be credible at the validation stage. If the IOC is a false positive alert instead of a genuine threat, blocking the IOC at the security system(s) can cause, sometimes significant, damages to the organization, such as restricting a number of client devices from accessing a specific computer or network resource. In some implementations, the likelihood of an IOC being a genuine threat and the potential impacts the genuine threat can have on the organization can be accounted for to determine the potential damage of a false positive alert associated with the IOC. A greater potential damage of a false positive alert can correspond to a lower risk score.

In some cases, an IOC can be added to the security system(s) after all IOCs before it (i.e., IOCs having higher priorities than the IOC) on the prioritization list have been processed. In some cases, at least one of the following operations can be performed on the IOC: adding the IOC to a firewall to block network traffic associated with the IOC, adding the IOC to an EPP or an EDR to block attacks associated with the IOC at the endpoints, or adding a rule associated with the IOC to a Splunk platform. In some instances, the IOC assessment engine 104 can generate an indication indicating that the IOC should be added to the one or more security systems, and transmit the indication to the one or more security systems via, for example, the interface of the one or more security systems (e.g., the interface 122). In some instances, the IOC assessment engine 104 can transmit the IOC itself to the one or more security systems via, for example, the interface of the one or more security systems (e.g., the interface 122).

In some examples, a security system can have a limit on the quantity of IOCs that can be added to the security system. If the IOC size limit has been reached and an additional IOC needs to be added to the security system, a determination can be made whether the additional IOC can replace an IOC that is already in the security system. Specifically, in some implementations, the aggregate risk scores of all IOCs currently added to the security system can be calculated. The method of calculating the aggregate risk score can be the same as the aggregate risk score calculation method described above. The aggregate risk scores of all IOCs currently added to the security system can be compared with the aggregate risk score of the additional IOC. If the aggregate risk score of the additional IOC is higher than the aggregate risk score of any IOC currently in the security system, the IOC having the lowest aggregate risk score can be removed from the security system and the additional IOC can then be added to the security system.

In some implementations, ongoing monitoring (e.g., continuous or periodic) can be performed on the IOCs added to all security systems to remove any redundant IOC. In some cases, an IOC can be redundantly added to more than one security systems, whereas adding the IOC to a subset of the more than one security systems is sufficient to prevent or mitigate attacks associated with the IOC. Therefore, when a redundant IOC is identified, the redundant IOC can be removed from at least one of the more than one security systems. By doing so, the at least one security system can have more available space for future IOC(s).

At 208, when the security system 120 detects an IOC, the security system 120 can send a risk alert to the access control engine 140. For example, when an endpoint solution detects an IOC (e.g., a hash value of a malicious file, a ransomware, a virus, etc.) on a client device, the endpoint solution can send a risk alert to the access control engine 140 which can then implement corrective action towards the client device.

At 210, when an IOC associated with the client 160 is detected, the access control engine 140 can control access of the client 160 to resources with the networked environment. In some cases, the access control engine 140 can receive a risk alert from the security system 120 indicating that an IOC is detected for the client 160. The access control engine 140 can then take a corrective action, e.g., in the form of restricting access of the client 160 to resources within the networked environment (e.g., the internal system 102). In some cases, when the threat of the client 160 has been cleared, the security system 120 can send a restriction removal request to the access control engine 140. The access control engine 140 can then take an action, e.g., in the form of enabling or granting the client 160 access to resources within the networked environment.

Figure 3:
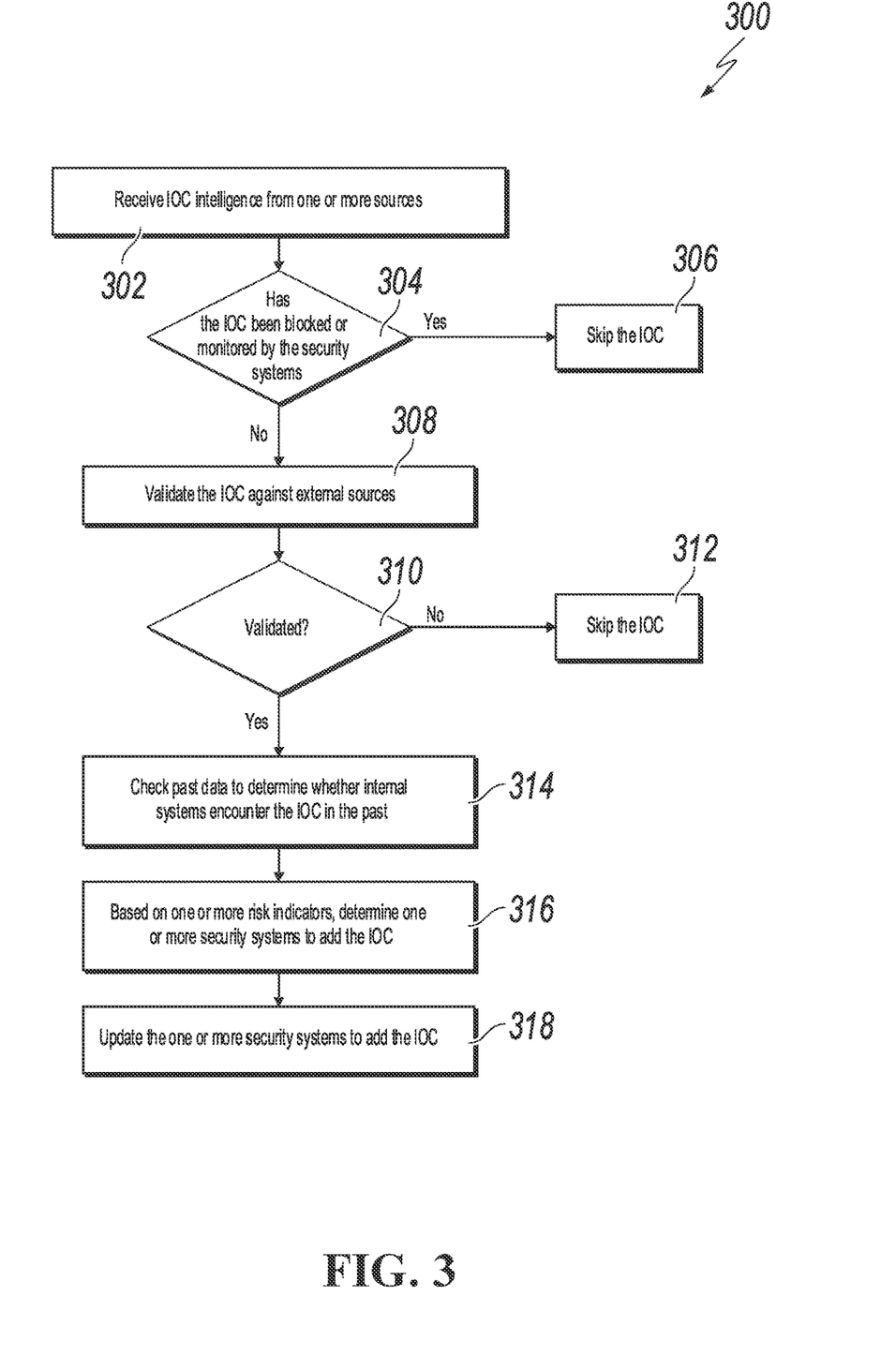
FIG. 3 illustrates a flow diagram of an example method for automatic IOC validations and prioritization and threat remediation based on the IOCs in a networked environment.

FIG. 3 illustrates a flow diagram of an example method 300 for automatic IOC validations and prioritization and threat remediation based on the IOCs in a networked environment, such as the networked system 100. It should be understood that method 300 may be performed, for example, by any suitable system, environment, software, and hardware, or a combination of systems, environments, software, and hardware as appropriate. In some instances, method 300 can be performed by one or more components of the system 100, including, among others, the IOC assessment engine 104, or portions thereof, described in FIG. 1, as well as other components or functionality described in other portions of this description. In other instances, the method 300 can be performed by a plurality of connected components or systems, such as those illustrated in FIG. 2. Any suitable system(s), architecture(s), or application(s) can be used to perform the illustrated operations.

At 302, IOC intelligence can be received from one or more sources, where the IOC intelligence includes an IOC. In some cases, receiving the IOC intelligence can include at least one of receiving IOCs detected by internal teams of an organization, or receiving IOCs from an external source including at least one of an external vendor or an open source organization.

At 304, it can be determined, based on querying security systems, whether the IOC has been added to the security systems. In some cases, in response to determining that the IOC has not been added to any of the security systems, the IOC can be validated with external sources that include potential IOCs. In some cases, in response to determining that the IOC has been added to the security systems, the IOC can be skipped at 306. In some cases, in response to determining that the IOC has not been added to the security systems, the method 300 can proceed to 308.

At 308, the IOC can be validated against external sources. In some implementations, in response to determining that the IOC matches one or more potential IOCs included in the external sources, the IOC can be determined as validated.

At 310, it can be determined whether the IOC is validated. In some cases, in response to determining that the IOC is not validated, the IOC can be skipped at 312. In some instances, in response to determining that the IOC is validated, the method can proceed to 314.

At 314, past data can be checked to determine whether internal systems encounter the IOC in the past. In some instances, if the IOC appeared in the internal computer systems or networks in the past, it can indicate that the internal systems were under attack, but no one was aware of it. If the internal systems encountered the IOC in the past, an internal investigation process can be initiated to prevent further impacts of the attack.

At 316, one or more security systems to add the IOC can be determined based on one or more risk indicators. In some cases, the one or more security systems include at least one of a firewall, an EDR system, an EPP, or a Splunk platform. In some cases, determining the one or more security systems to add the IOC includes determining whether the IOC is associated with network security stack or endpoint, determining, based on one or more risk indicators of the IOC, one or more security systems to add the IOC, and adding the IOC to the one or more security systems. In some implementations, in response to determining that the IOC is associated with network security stack, it can be determined that the IOC is to be added to a firewall. In some instances, in response to determining that the IOC is associated with endpoint, it can be determined that the IOC is to be added to at least one of an EDR system or an EPP.

In some cases, the one or more security systems include a first security system. A risk score of the IOC can be determined, based on the one or more risk indicators of the IOC. It can then be determined, based on the risk score of the IOC and at least one risk score of at least one IOC currently added to the first security system, an order of a plurality of IOCs including the IOC and the at least one IOC.

In some examples, it can be determined that the first security system has satisfied an IOC size limit before adding the IOC. A particular IOC ranked last in the order can then be determined based on the order. The particular IOC can then be removed from the first security system.

In some cases, the one or more risk indicators include at least one of: potential damage of a potential security threat associated with the IOC, a probability of a potential security threat associated with the IOC, or potential damage of a false positive alert associated with the IOC.

At 318, the one or more security systems can be updated to include the IOC. In some implementations, an indication indicating that the IOC should be added to the one or more security systems can be generated. The indication can then be transmitted to the one or more security systems.

In some cases, ongoing monitoring of IOCs added to all security systems can be performed. A redundancy in adding a redundant IOC to more than one security systems can be identified. The redundant IOC can then be removed from at least one of the more than one security systems. In some instances, the ongoing monitoring is continuous or periodic.

The above description is provided in the context of computer and network security and, in particular, automatic validations and prioritizations of IOCs for the security systems in a networked environment (e.g., a financial institution). In some instances, corrective actions can be taken in response to detections of threat events associated with the IOCs. One skilled in the art will appreciate that the above described techniques are not limited to this computer and network security application, but can be applicable in other contexts. For example, in some implementations, the above described techniques can be used to implement Internet moderation and take corrective actions to stop the distributions of, for example, fake news that needs to be controlled or suppressed. In such applications, an assessment engine can collect intelligence including indicators of fake news (e.g., a URL to a web site containing the fake news, an IP address of a server that distributes fake news, etc.). Then, the assessment engine can validate the indicators of fake news. When an indicator of fake news is validated, the indicator of fake news can be added to a security system to monitor and/or take corrective actions to stop the fake news from being accessed, published, or viewed on the Internet.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method of automating validation and prioritization of indicators of compromise (IOC), comprising:
receiving indicator of compromise (IOC) intelligence comprising an IOC;
validating the IOC automatically based on querying internal sources and external sources, wherein the internal sources and external sources collect IOC information;
determining, based on one or more risk indicators of the IOC and querying the internal sources and the external sources, one or more security systems to add the IOC, wherein the one or more security systems comprise a first security system;

determining that the first security system has satisfied an IOC size limit before adding the IOC, wherein the IOC size limit is the greatest number of IOCs allowed to be added to the first security system;

determining, based on the one or more risk indicators of the IOC, a risk score of the IOC and at least one risk score of at least one IOC currently added to the first security system;

determining a particular IOC having the relatively lowest risk score among a plurality of IOCs comprising the IOC and the at least one IOC;

removing the particular IOC from the first security system; and adding the IOC to the one or more security systems.

2. The computer-implemented method of claim 1, wherein validating the IOC comprises:

determining, based on querying security systems, whether the IOC has been added to the security systems;

in response to determining that the IOC has not been added to any of the one or more security systems, validating the IOC with the external sources that comprise potential IOCs; and in response to determining that the IOC matches one or more potential IOCs comprised in the external sources, determining that the IOC is validated.

3. The computer-implemented method of claim 1, wherein determining the one or more security systems to add the IOC comprises:

determining whether the IOC is associated with network security stack or endpoint.

4. The computer-implemented method of claim 3, comprising:

in response to determining that the IOC is associated with network security stack, determining that the IOC is to be added to a firewall; or in response to determining that the IOC is associated with endpoint, determining that the IOC is to be added to at least one of an Endpoint Detection and Response (EDR) system or an Endpoint Protection Platform (EPP).

5. The computer-implemented method of claim 1, comprising:

performing ongoing monitoring of IOCs added to all security systems;

identifying a redundancy in adding a redundant IOC to more than one security systems; and removing the redundant IOC from at least one of the more than one security systems.

6. The computer-implemented method of claim 5, wherein the ongoing monitoring is continuous or periodic.

7. The computer-implemented method of claim 1, wherein the one or more security systems comprise at least one of a firewall, an EDR system, an EPP, or a Splunk platform.

8. The computer-implemented method of claim 1, wherein the one or more security systems comprise a first security system, and wherein the computer-implemented method comprises:

determining, based on the risk score of the IOC and the at least one risk score of the at least one IOC currently added to the first security system, an order of the plurality of IOCs comprising the IOC and the at least one IOC.

9. The computer-implemented method of claim 8, wherein the particular IOC is ranked last in the order.

10. The computer-implemented method of claim 8, wherein the one or more risk indicators comprise at least one of:

potential damage of a potential security threat associated with the IOC;

a probability of a potential security threat associated with the IOC; or potential damage of a false positive alert associated with the IOC.

11. The computer-implemented method of claim 1, wherein receiving the IOC intelligence comprises at least one of:

receiving IOCs detected by internal teams of an organization; or receiving IOCs from an external source comprising at least one of an external vendor or an open source organization.

12. The computer-implemented method of claim 1, wherein adding the IOC to the one or more security systems comprises:

generating an indication indicating that the IOC should be added to the one or more security systems; and transmitting the indication to the one or more security systems.

13. The computer-implemented method of claim 1, wherein validating the IOC includes inputting information associated with the IOC into a machine learning model to determine a likelihood of a threat.

14. A system comprising:

at least one memory storing instructions; and at least one hardware processor interoperably coupled with the at least one memory, wherein execution of the instructions by the at least one hardware processor causes performance of operations to automate the validation and prioritization of indicator of compromise (IOC) comprising:

receiving indicator of compromise (IOC) intelligence comprising an IOC;

validating the IOC automatically based on querying internal sources and external sources, wherein the internal sources and external sources collect IOC information;

determining, based on one or more risk indicators of the IOC and querying the internal sources and external sources, one or more security systems to add the IOC, wherein the one or more security systems comprise a first security system;

determining that the first security system has satisfied an IOC size limit before adding the IOC, wherein the IOC size limit is the greatest number of IOCs allowed to be added to the first security system;

determining, based on the one or more risk indicators of the IOC, a risk score of the IOC and at least one risk score of at least one IOC currently added to the first security system;

determining a particular IOC having the relatively lowest risk score among a plurality of IOCs comprising the IOC and the at least one IOC;

removing the particular IOC from the first security system; and adding the IOC to the one or more security systems.

15. The system of claim 14, wherein validating the IOC comprises:

determining, based on querying security systems, whether the IOC has been added to the security systems;

in response to determining that the IOC has not been added to any of the one or more security systems, validating the IOC with the external sources that comprise potential IOCs; and in response to determining that the IOC matches one or more potential IOCs comprised in the external sources, determining that the IOC is validated.

16. The system of claim 14, wherein determining the one or more security systems to add the IOC comprises:

determining whether the IOC is associated with network security stack or endpoint.

17. The system of claim 16, the operations comprising:

in response to determining that the IOC is associated with network security stack, determining that the IOC is to be added to a firewall; or in response to determining that the IOC is associated with endpoint, determining that the IOC is to be added to at least one of an Endpoint Detection and Response (EDR) system or an Endpoint Protection Platform (EPP).

18. A non-transitory, computer-readable medium storing computer-readable instructions, that upon execution by at least one hardware processor, cause performance of operations to automate the validation and prioritization of indicator of compromise (IOC), comprising:

receiving indicator of compromise (IOC) intelligence comprising an IOC;

validating the IOC automatically based on querying internal sources and external sources, wherein the internal sources and external sources collect IOC information;

determining, based on one or more risk indicators of the IOC and querying the internal sources and external sources, one or more security systems to add the IOC, wherein the one or more security systems comprise a first security system;

determining that the first security system has satisfied an IOC size limit before adding the IOC, wherein the IOC size limit is the greatest number of IOCs allowed to be added to the first security system;

determining, based on the one or more risk indicators of the IOC, a risk score of the IOC and at least one risk score of at least one IOC currently added to the first security system;

determining a particular IOC having the relatively lowest risk score among a plurality of IOCs comprising the IOC and the at least one IOC;

removing the particular IOC from the first security system; and adding the IOC to the one or more security systems.

19. The non-transitory, computer-readable medium of claim 18, wherein validating the IOC comprises:

determining, based on querying security systems, whether the IOC has been added to the security systems;

in response to determining that the IOC has not been added to any of the one or more security systems, validating the IOC with the external sources that comprise potential IOCs; and in response to determining that the IOC matches one or more potential IOCs comprised in the external sources, determining that the IOC is validated.

20. The non-transitory, computer-readable medium of claim 18, wherein determining the one or more security systems to add the IOC comprises:

determining whether the IOC is associated with network security stack or endpoint.

* * * * *